United States Patent [19]

Bruguera

[11] 4,430,905
[45] Feb. 14, 1984

[54] MOTOR VEHICLE STEERING COLUMN

[75] Inventor: Raimon S. Bruguera, Barcelona, Spain

[73] Assignee: Bendiberica S.A., Barcelona, Spain

[21] Appl. No.: 232,616

[22] Filed: Feb. 9, 1981

[30] Foreign Application Priority Data

Feb. 7, 1980 [ES] Spain ............................... 489058

[51] Int. Cl.³ .............................................. B62D 1/18
[52] U.S. Cl. ....................................... 74/493; 403/86;
403/160; 464/170; 464/178
[58] Field of Search ................. 74/492, 493; 280/775;
403/86, 160; 464/170, 178

[56] References Cited

U.S. PATENT DOCUMENTS

| 327,877 | 10/1885 | Hodges | 403/86 |
| 1,478,216 | 12/1923 | Gilbody | 403/86 |
| 2,559,093 | 7/1951 | Rzeppa | 74/492 X |
| 3,144,785 | 8/1964 | Steiner et al. | 74/493 |
| 3,934,488 | 1/1976 | Cantley | 74/492 |

Primary Examiner—Allan D. Herrmann
Attorney, Agent, or Firm—Paul David Schoenie; Ken C. Decker

[57] ABSTRACT

Adjustable steering column for a motor vehicle of the type comprising two shaft sections connected by an articulated coupling and wherein the improvement consists in providing two casings for respective sections, assembled by flanges, at least one of which is inclined with respect to the normal to the longitudinal axis of the casing.

5 Claims, 1 Drawing Figure

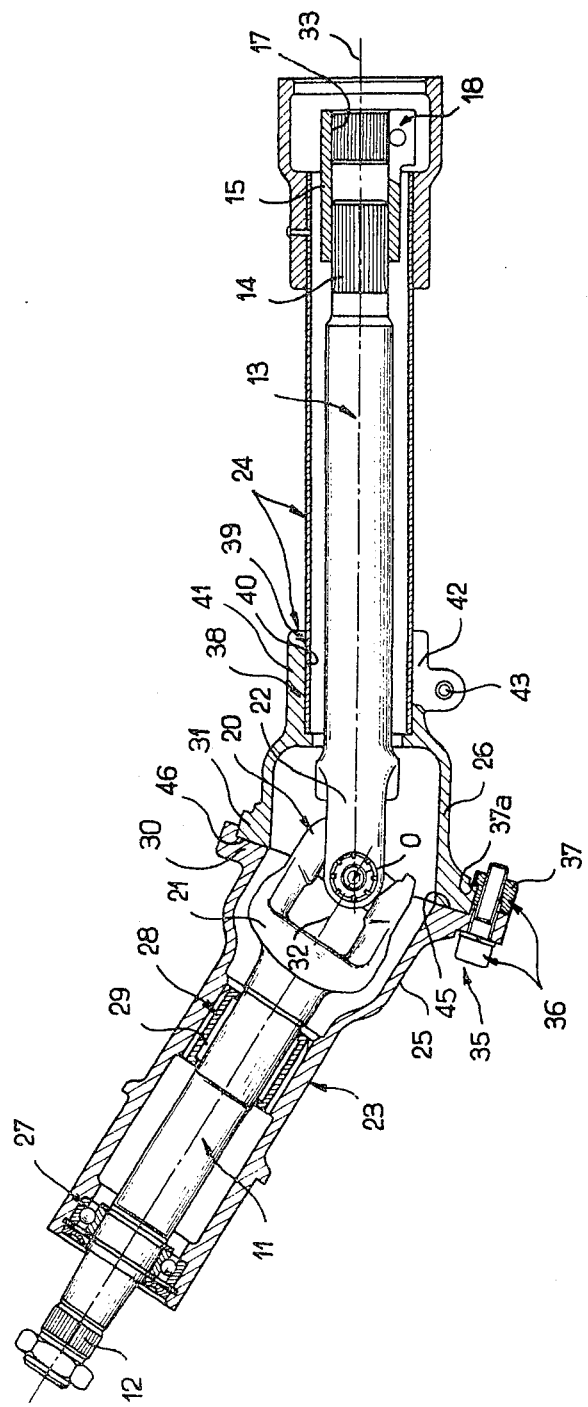

MOTOR VEHICLE STEERING COLUMN

The invention concerns a motor vehicle steering column, particularly a steering column with adjustable angle allowing the steering wheel to be positioned and oriented as the usual driver of the vehicle requires.

Systems allowing the orientation of the steering wheel of a motor vehicle to be altered so that the user can drive in greater comfort have already been proposed. Such systems have principally been found hitherto on some private vehicles. A particular system is known consisting of a lockable articulation disposed between the steering wheel and the end of the transmitting control shaft, a lever disposed on the side of the steering wheel allowing the lockable articulation to be moved and immobilized in the required position. Such a system is relatively complicated and expensive. The invention proposes a simpler and more reliable system, very suitable for equipping a heavy vehicle which represents the field of application principally concerned.

With this aim, the invention therefore concerns a motor vehicle steering column, comprising two sections of a control shaft connected end to end by an articulated coupling means, characterised in that it also has two casings respectively protecting the said sections and assembled end to end by means of two cooperating means forming assemly flanges at least one of which is inclined with respect to the normal to the longitudinal axis of the casing to which it belongs and in that means of assembling and clamping the said cooperating means forming flanges are operative for at least two relative angular positions of the said casings.

A preferred embodiment of a steering column according to the invention allows a relative adjustmnet of the two parts of the steering column to an infinite number of possible angular positions.

The invention will be more easily understood and its other advantages will appear more clearly in the light of the following description of a preferred embodiment of the invention, with reference to the attached drawing in which the single FIGURE represents a sectional view of a steering column according to the principles of the invention.

This steering column has two transmitting control shaft sections, a first section 11, a grooved end 12 of which is adapted to receive a steering wheel (not represented) and a second section 13 also with a grooved end 14 on which an adaptor piece 15 is engaged, in the form of a sleeve, allowing the connection of the end 14 to the input member of the steering box, which can be constituted in particular by the input shaft of a valve for power-assisted steering. The sleeve 15 has internal grooves 17 for this and is split axially at these grooves so as to provide an annular clamp 18. The sections 11 and 13 are connected end to end by an articulated coupling means consituted here by a constant-velocity universal joint, preferably a Cardan joint 20, each fork 21, 22 of the universal joint 20 constituting an axial end of one of the sections 11, 13 respectively. The steering column also has two casings 23 and 24, forming a housing and protecting the sections 11 and 13 respectively. For this, each casing 23 or 24 has a generally cylindrical shape but its end portion 25 or 26 protecting the fork 21 or 22, respectively, has an accordingly enlarged section so as not to risk jamming the universal joint 20. The section 11 is mounted to rotate about its longitudinal axis in the casing 23 by means of a ball bearing 27, on the one hand, located at the end of the casing 23 which is opposite from the enlarged end portion 25 and an inner bearing 28, on the other hand, equipped in particular with a rubber contact lining 29.

According to the invention, the casings 23 and 24 are assembled end to end (by their enlarged end portions 25 and 26) and have two cooperating means forming respectively assembly flanges 30 and 31 for this, at least one of which is inclined with respect to the normal to the longitudinal axis of the casing to which its belongs. In the example described, the two flanges 30 and 31 are so inclined, i.e. the flange 30 is slightly inclined with respect to plane perpendicular to the longitudinal axis 32 of the section 23 while the flange 31 is slightly inclined with respect to plane perpendicular to the longitudinal axis 33 of the casing 24.

According to the embodiment shown, the means forming flanges 30 and 31 are formed with flat assembly surfaces 45 and 46, respectively, which are in mutual contact after assembly of the casings and thus define an assembly plane of the latter, in which the centre 0 of the universal joint 20 is substantially located. In addition, means 35 for assembling and clamping these flanges 30 and 31 are operative for at least two relative angular positions of the casings 23 and 24. In the present embodiment, these assembly and clamping means are constituted by three bolts 36 mounted at the periphery of the flange 30 (three bolts are provided spaced at 120° at the periphery of this flange but only one is shown in the drawing) and the nut 37 of each bolt is arranged in the form of a catch capable of coming into engagement, on clamping, with a peripheral shoulder 37a of the flange 31. The outer perimeter of the two assembly surfaces 45 and 46 is preferably circular so that an infinite number of relative angular positions can thus be obtained for the two casings 23 and 24, a given angular position being stabilized by the clamping action of the bolts 36. It will be noted in this regard that the casing 24 has principally two parts 38 and 39 which fit one into the other coaxially. The part 38 is substantially composed of the whole afore-mentioned enlarged end portion 26 and the flange 31 and it has an inner bore 40 which receives the cylindrical end of the part 39. The wall 41 of the bore 40 has an axial slot 42 over a certain length, to change this wall 41 into a sort of annular clamp, the slot 42 being closed by means of a bolt 43. The part 38 is thus coaxially orientable with respect to the part 39 (by temporary loosening of the bolt 43) which is fixed with respect to a chassis mounting (not represented) on which the other elements of the vehicle steering system are mounted.

Adjustment of the angle of the steering wheel is therefore carried out as follows. When the bolts 36 are loosened, it is possible to cause the two contact surfaces 45 and 46 to slide in rotation with respect to one another. This sliding is clearly accompanied by a variation in the angle between the axes 32 and 33, i.e. in fact a variation in the angle of the steering wheel which is mounted at the grooved end 12 of the section 11. The bolts 36 are simply tightened up again when the angle of the steering wheel corresponds to the requirements of the driver of the vehicle. As this variation in angle of the steering wheel is accompanied by a lateral off-setting, this off-setting is compensated for and the steering wheel returned to the proper position simply by temporarily loosening the bolt 43 and causing the part 38 to turn axially with respect to the fixed part 39.

The invention is of course not limited to the embodiment of the steering column as just described; it includes all the technical equivalents of the means used if these are within the scope of the following claims.

What is claimed is:

1. A vehicle steering column, having two control shaft sections connected end to end by an articulated coupling means, characterized in that it also has two casings respectively protecting said sections and assembled end to end by means of flanges defined by enlarged ends of the two casings, at least one of the flanges is inclined with respect to the normal to the longitudinal axis of the casing to which it belongs and in that means for clamping said flanges are operative for at least two relative angular positions of the said casings, said clamping means having several bolts mounted at the periphery of one of said flanges, the nut of each bolt being arranged in the form of a catch capable of coming into engagement on clamping with a peripheral shoulder of the other flange, and the perimeter of said casing ends being circular so as to allow an infinite number of relative angular positions for the two afore-mentioned casings, one of said casings comprising two parts which are rotatable relative to each other, one of said two parts defining the flange for said one casing, said one part further defining means adjacent the enlarged end of said one casing to secure said one part to said other part and said other part being fixed to a portion of the vehicle.

2. A motor vehicle steering column, having two control shaft sections connected end to end by an articulated coupling means having a center of articulation and two tubular casings respectively protecting said sections coaxial therewith and assembled end to end by assembling means, characterized in that said assembling means consist of two mutually cooperating means forming assembly flanges having annular front faces, at least one of which extends in a plane inclined with respect to the normal to the longitudinal axis of the casing to which it belongs and including said center of articulation of said coupling means, said assembling means comprising releasable means for assembling and clamping said cooperating means forming flanges in at least two relative angular positions of said casings and of said shaft sections, said cooperating means forming assembly flanges having respective flat assembly front faces, said assembly and clamping means includes several bolts mounted at the periphery of one of said flanges for cooperation with bolts each arranged in the form of a catch capable of coming into clamping engagement with a peripheral shoulder of the other flange.

3. A steering column according to claim 2, characterized in that said flat assembly front faces have each a circular perimeter so as to allow an infinite number of relative angular positions for the two said casings.

4. A steering column according to claim 3, characterized in that one of said casings is composed of at least two parts which are substantially coaxially and mutually adjustable rotatingly assembled by a releasable clamping means.

5. A steering column according to claim 2, characterized in that said articulated coupling means is a constant-velocity universal joint and preferably a Cardan joint.

* * * * *